Patented Apr. 14, 1953

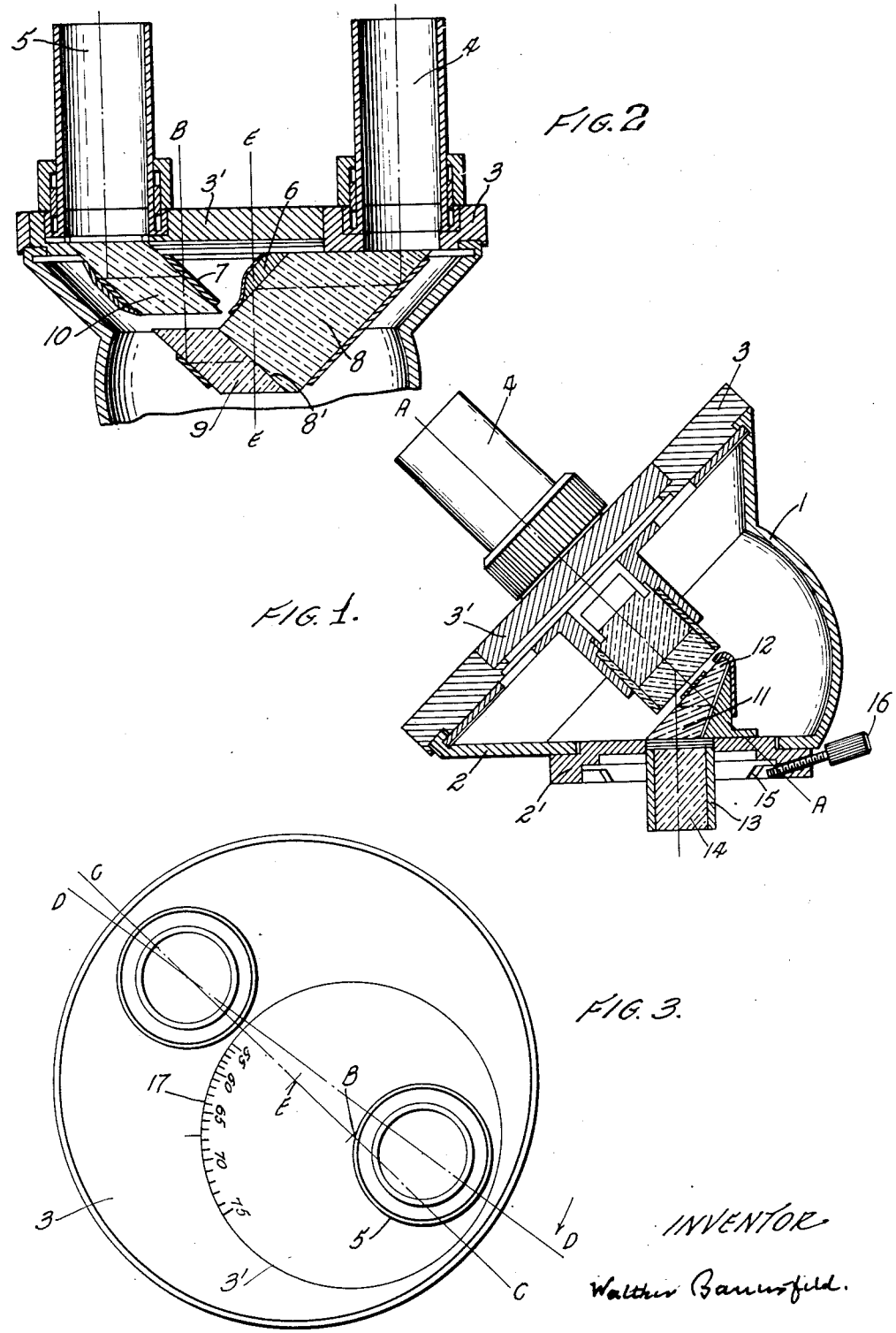

2,634,654

UNITED STATES PATENT OFFICE 2,634,654

BINOCULAR TUBE FOR MICROSCOPES

Walther Bauersfeld, Heidenheim on the Brenz, Germany, assignor to Zeiss-Opton Optische Werke Oberkochen G. m. b. H., Oberkochen, Germany Application July 13, 1950, Serial No. 173,554
In Germany July 9, 1949

6 Claims. (Cl. 88—39)

In the known microscope tubes for binocular observation a prism system is arranged for dividing the light rays and leading the two halves of the same to the two oculars, some parts of said prism system being movable relatively to each other for adjusting the distance apart of the oculars to the interpupillary distance of the observer.

With the object of the invention the cover of the tube, carrying the oculars is rotatable about its axis together with one of the oculars, while the other ocular is rotatable relatively to the cover about an axis, which is parallel to the axis of the cover, lying eccentrically with respect to this axis. The object of the invention affords an easier production of the tube as all essential parts may be produced by turning. Furthermore with a relatively small glass block interposed in the path of rays before said prism system the tube can be given the same optical length as have the usual monocular tubes, whereat in either case the same magnification can be attained. Therefore, in interchanging the new binocular tube and a monocular one no readjustment of the microscope is necessary.

Suitably the ocular which is rotatable relatively to the cover of the tube is arranged eccentrically in a circular disc which latter is disposed rotatably on the cover, its center lying somewhat apart from the axis of the cover. This disc may be provided on its circumference with a scale indicating the distance apart of the oculars for the moment.

The system for dividing the light rays suitably consists of two parts the one of which being fitted to the cover and comprising a ray dividing layer and the other being a rhomboidal prism rotatable together with that ocular which is eccentrically rotatable. The first named part may be constructed in such a manner, that the rays traversing the ray dividing layer undergo two reflections before reaching the ocular fitted to the cover, while the rays reflected by said layer are again reflected within this part before entering into the rhomboidal prism. The eccentric axis of rotation of the rhomboidal prism suitably coincides with the axis of the ray pencil system entering the same.

In case the binocular tube according to the invention is destined for inclined observation a suitable prism may be arranged in front of the ray dividing prism system.

In the drawing an example of the invention is shown. Fig. 1 is a vertical section, Fig. 2 being a section along line A—A of Fig. 1, and Fig. 3 showing the tube as seen in the direction of the axis of the oculars.

The tube consists of a casing 1 having on one side a cover 2, 2' and on the other side a circular cover 3 which is rotatable about its axis E. Two ocular tubes 4 and 5 are destined to receive an eyepiece each, ocular tube 4 being fitted to the cover 3, while ocular tube 5 is fitted on a disc 3' inserted into cover 3 rotatably about its axis B. On the cover 3 a ray dividing prism system is fastened by means of supports 6 and 7. Said system consists of a prism composed of two members 8 and 9 cemented together, a partially reflecting layer 8' being interposed between the same, and a rhomboidal prism 10 fitted on disc 3'. By means of a support 11 a reflecting prism 12 is arranged in front of the ray dividing prism system for deviating the rays entering the tube into an inclined direction. Within an opening 13 a glass block 14 is fastened for shortening the optical length of the tube. By fastening means 15 and a screw 16 the entire binocular tube is to be fitted on the tube of a microscope. On a scale 17 provided on the disc 13' the distance apart of ocular tubes 4 and 5 for the moment is indicated.

By the fact that the optical parts are partly fitted on the cover 2 and partly on the covers 3 and 3' a very convenient mounting of the same is attained, as they are to be fitted on the covers before the latter are inserted into the casing 1.

The course of the rays within the example shown in the drawing is as follows. The rays passing through the glass block 14 are deviated by prism 12 and divided into two halves each by the layer 8'. One half passes through layer 8', is twice reflected by prism 8 and enters into the ocular tube 4. The other half is reflected by layer 8, then again reflected by the prism 9 and is received by the rhomboidal prism 10. When passing from prism 9 to prism 10 the axis of this ray pencil system coincides with the axis of rotation B of disc 3'. After having been reflected twice by prism 10 this half of the rays is entering into ocular tube 5. Thereby, the dimensions of the optical parts are so chosen that the optical length of the path of either half of the rays is the same. As may be seen from the drawing, each ray traverses a relatively long way within glass. Hence, a relatively short glass block 14 is sufficient, for adapting the optical length of the path of rays to the optical length of a monocular tube. When interchanging the new binocular tube and a monocular one, no readjustment of the microscope, therefore, is necessary.

For adapting the distance apart of the two eyepieces to the interpupillary distance of the observer the disc 3' is turned about its axis B. When thereby the line D—D interconnecting the two eyepieces deviates from the horizontal position (marked C—C in Fig. 3), it may be brought again in the horizontal position by turning the cover 3 about its axis E (as indicated by an arrow in Fig. 3).

I claim:

1. A binocular tube attachment for microscopes with interocular adjustment of the two eyepieces, comprising a tubular housing having a mounting base plate at its lower side adapted for attaching it to the upper portion of a microscope stand, a cover plate connected to the upper side of said housing rotatable in and with respect to said housing about an axis substantially central to said housing, two ocular tubes each carrying one of said eyepieces, said cover plate carrying the one said ocular tube rigidly connected thereto outside the axis of rotation, a circular disc mounted on said cover plate rotatable about an axis spaced from and parallel to the said cover plate rotation axis, said disc carrying said second ocular tube rigidly connected thereto outside said disc rotation axis, and a prism system arranged in the inner space of said housing comprising a plurality of optically cooperating single prisms one of which is rigidly connected to said mounting base plate, a second one rigidly connected to said cover plate and a third one rigidly connected to said disc, said prisms including optical surfaces for receiving the imaging light beam emanating from the microscope objective lens system, said second prism having a partially transparent and partially transmitting surface for splitting up said beam into two light beams, said second and said third prisms each having reflecting surfaces for directing said partial light beams into one of said eyepieces each.

2. A binocular tube attachment for microscopes according to claim 1 with the said second beam splitter prism composed of two members cemented together, said third prism being a rhomboidal prism rigidly connected to said rotatable disc, both said second prism and said third rhomboidal prism each having two reflecting surfaces for reflecting each of the partial light beams twice before reaching the respective eyepieces.

3. A binocular tube attachment for microscopes according to claim 1 with the said second beam splitter prism composed of two members cemented together, said third prism being a rhomboidal prism rigidly connected to said rotatable disc such as to have the central axis of said partial beam entering said third prism coinciding with the axis of rotation of said disc in all positions of rotation of said disc.

4. A binocular tube attachment for microscopes according to claim 1 with the said second beam splitter prism composed of two members cemented together, said third prism being a rhomboidal prism rigidly connected to said rotatable disc, said single prism mounted on said mounting base plate receiving the undivided imaging light beam emanating from the microscope objective lens system and causing inclined deviation of said beam before entering into said prism system.

5. A binocular tube attachment for microscopes according to claim 1 with the said second beam splitter prism composed of two members cemented together, said third prism being a rhomboidal prism rigidly connected to said rotatable disc, a glass block with parallel optical surfaces mounted to said housing base plate to receive the undivided imaging light beam emanating from the microscope objective lens system, said single prism mounted on said mounting base plate in the path of beam behind said glass block and having inclined optical surfaces causing inclined deviation of beam before entering into said second beam splitter prism.

6. A binocular tube attachment for microscopes according to claim 1 with a scale with circular pitch on said disc and an index mark applied to said cover plate cooperating with said scale for reading the values of interocular distance between said ocular tubes.

WALTHER BAUERSFELD.

References Cited in the file of this patent
UNITED STATES PATENTS

| Number | Name | Date |
|---|---|---|
| 1,807,613 | Bauersfeld et al. | June 2, 1931 |